US012486794B2

(12) United States Patent
Favaretto (10) Patent No.: US 12,486,794 B2
(45) Date of Patent: Dec. 2, 2025

(54) PROPULSION ASSEMBLY FOR A MOTOR VEHICLE (71) Applicant: FERRARI S.P.A., Modena (IT)

(72) Inventor: Fabrizio Favaretto, Modena (IT)

(73) Assignee: Ferrari S.P.A. (IT)

( * ) Notice: Subject to any disclaimer, the term of this patent is extended or adjusted under 35 U.S.C. 154(b) by 0 days.

(21) Appl. No.: 18/588,493

(22) Filed: Feb. 27, 2024

(65) Prior Publication Data
US 2024/0295190 A1 Sep. 5, 2024

(30) Foreign Application Priority Data
Mar. 2, 2023 (IT) .......................... 102023000003759

(51) Int. Cl.
F02B 37/10 (2006.01)
F02B 39/04 (2006.01)

(52) U.S. Cl.
CPC ............ *F02B 37/105* (2013.01); *F02B 39/04* (2013.01); *F05D 2220/40* (2013.01)

(58) Field of Classification Search
CPC .... F02B 37/105; F02B 39/04; F02B 2275/30; F02B 37/10; F05D 2220/40
See application file for complete search history.

(56) References Cited

U.S. PATENT DOCUMENTS 2,397,941 A * 4/1946 Birkigt ..................... F02B 33/00
74/665 H
5,154,057 A * 10/1992 Yoshioka .............. F02B 37/007
60/600
5,887,434 A * 3/1999 Arnell ................... F02B 37/105
123/561
6,343,473 B1 * 2/2002 Kanesaka ............... F02B 39/12
60/609
6,446,592 B1 * 9/2002 Wilksch ................. F02B 39/14
123/196 R
6,681,574 B2 * 1/2004 Berglund ................ F02B 39/04
60/624

(Continued)

FOREIGN PATENT DOCUMENTS

AU 2010345054 A1 8/2012
WO 2011096936 A1 8/2011

OTHER PUBLICATIONS

Search Report issued in Italian Patent Application No. 102023000003759.

Primary Examiner — Jesse S Bogue
(74) Attorney, Agent, or Firm — The Belles Group, P.C.

(57) ABSTRACT

A propulsion assembly for a motor vehicle includes an internal combustion engine comprising at least one movable member according to an operating regime of said engine, and a turbocharger comprising a turbine adapted to expand exhaust gases of said engine by generating work and a compressor adapted to compress air by work generated by the turbine to supercharge said engine, the compressor comprising a compressor shaft coupled to the turbine in such a manner as to be driven into a rotation by the work generated by the turbine and being configured to compress air via the rotation of the compressor shaft, characterized by further comprising mechanical transmission means configured to couple the movable member to the compressor shaft, thereby establishing a transmission of motion between the movable member and the compressor shaft.

9 Claims, 6 Drawing Sheets (56) References Cited

U.S. PATENT DOCUMENTS

| | | | | |
|---|---|---|---|---|
| 7,426,830 B2* | 9/2008 | Schorn | .................... | F02B 37/22 |
| | | | | 123/562 |
| 8,191,371 B2* | 6/2012 | Kley | .................... | F02B 37/105 |
| | | | | 60/608 |
| 8,561,403 B2* | 10/2013 | VanDyne | ................ | F02B 41/10 |
| | | | | 60/624 |
| 8,910,614 B2* | 12/2014 | Bevan | ................. | F02D 41/0007 |
| | | | | 123/568.11 |
| 9,932,991 B2* | 4/2018 | Wade | ................... | F04D 25/024 |
| 10,145,320 B1* | 12/2018 | Zeng | ...................... | F02M 26/49 |
| 10,280,850 B1* | 5/2019 | Zeng | ................... | F02D 41/0007 |
| 11,041,456 B2 | 6/2021 | Dalmas, II et al. | | |
| 12,012,888 B2* | 6/2024 | Favaretto | ................ | F02B 37/04 |
| 12,180,882 B2* | 12/2024 | Favaretto | ................ | F02B 39/04 |
| 2009/0025696 A1 | 1/2009 | Lovgren | | |
| 2010/0031935 A1* | 2/2010 | VanDyne | ................ | F02B 39/04 |
| | | | | 475/196 |
| 2010/0199666 A1* | 8/2010 | VanDyne | ............... | F02M 26/02 |
| | | | | 60/605.2 |
| 2019/0003405 A1* | 1/2019 | Fluhler | ............ | F02M 35/10026 |
| 2020/0332720 A1* | 10/2020 | Bortoli | ...................... | F16H 3/08 |
| 2022/0003152 A1* | 1/2022 | Bevilacqua | ............... | F01D 1/04 |
| 2024/0240585 A1* | 7/2024 | Favaretto | ............... | B60K 13/02 |

* cited by examiner

PROPULSION ASSEMBLY FOR A MOTOR VEHICLE

CROSS-REFERENCE TO RELATED APPLICATIONS

This patent application claims priority from Italian patent application no. 102023000003759 filed on Mar. 2, 2023, the entire disclosure of which is incorporated herein by reference.

TECHNICAL FIELD

The invention relates to a propulsion assembly for a motor vehicle, in particular comprising an internal combustion engine supercharged by a turbocharger.

PRIOR ART

Many motor vehicles are known to have a propulsion assembly with an internal combustion engine supercharged by a turbocharger.

In particular, the turbocharger often has significant dimensions when the engine is configured to deliver relatively high powers.

In this specific case, but also more generally, the turbocharger determines inefficiencies, for example when the engine operates at minimum regime or also at maximum regime.

In fact, when the revolutions of the engine are low or tending to the minimum, the available enthalpy of the exhaust gases is not sufficient for an optimal supercharging of the engine.

Similarly, when the revolutions of the engine are high or tending to the maximum, a part of the exhaust gases has to bypass the turbocharger via a so-called wastegate valve so as to prevent an overpressure in the intake manifold of the engine, so that a portion of the available enthalpy of the exhaust gases remains substantially unutilized.

In this context, the need is felt to improve the known propulsion assemblies, in particular in terms of efficiency and/or performance.

An object of the invention is to satisfy the need described above, preferably in a simple and reliable manner.

DESCRIPTION OF THE INVENTION

The object is achieved by a propulsion assembly for a motor vehicle, as defined in claim 1.

The dependent claims define particular embodiments of the invention.

BRIEF DESCRIPTION OF THE DRAWINGS

In the following, an embodiment of the invention is described for a better understanding thereof by way of non-limiting example and with reference to the accompanying drawings, wherein.

EMBODIMENTS OF THE INVENTION

Figure 1:
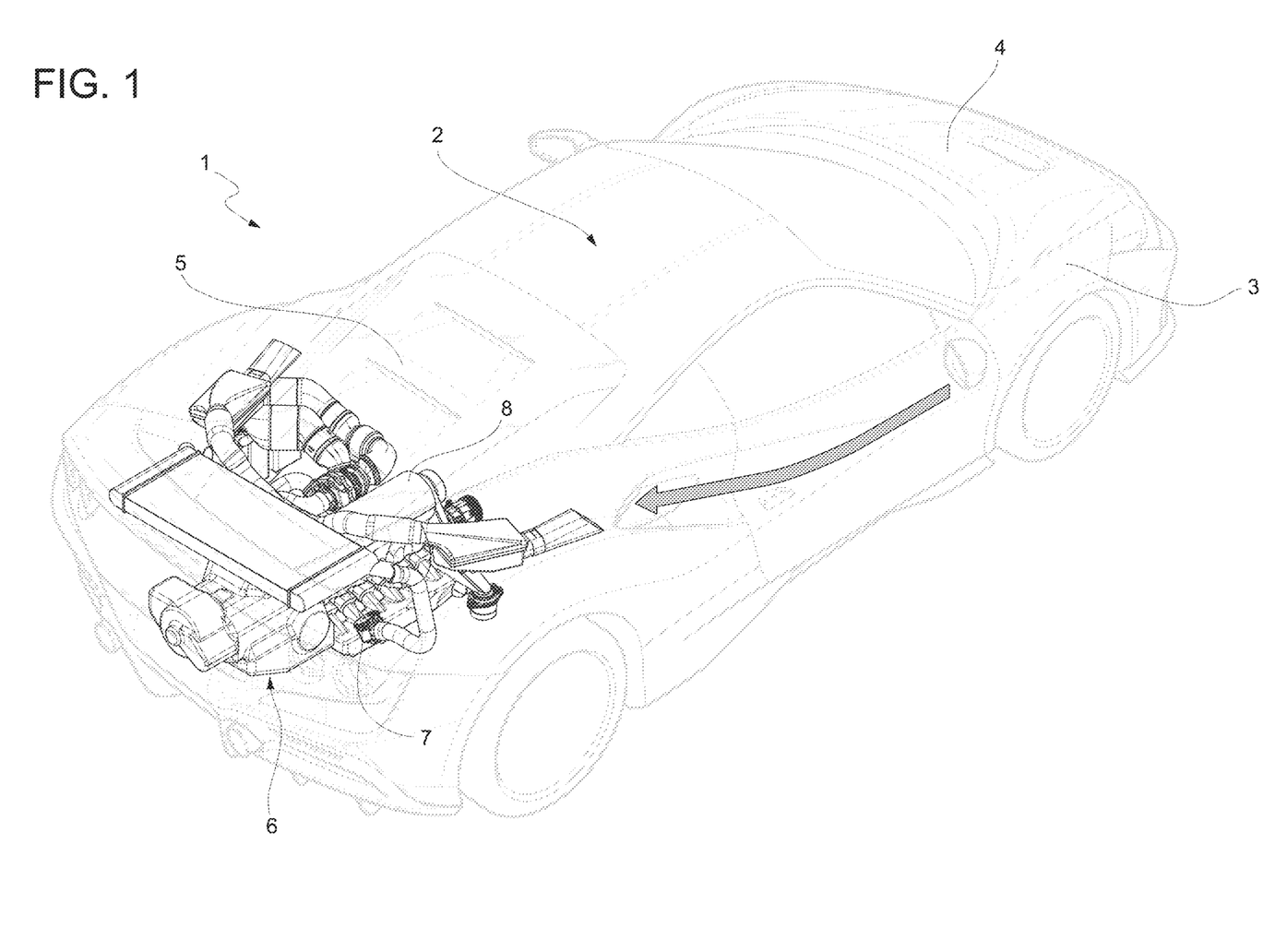
FIG. 1 is a perspective view of a motor vehicle comprising a propulsion assembly according to the invention.
Figure 2:
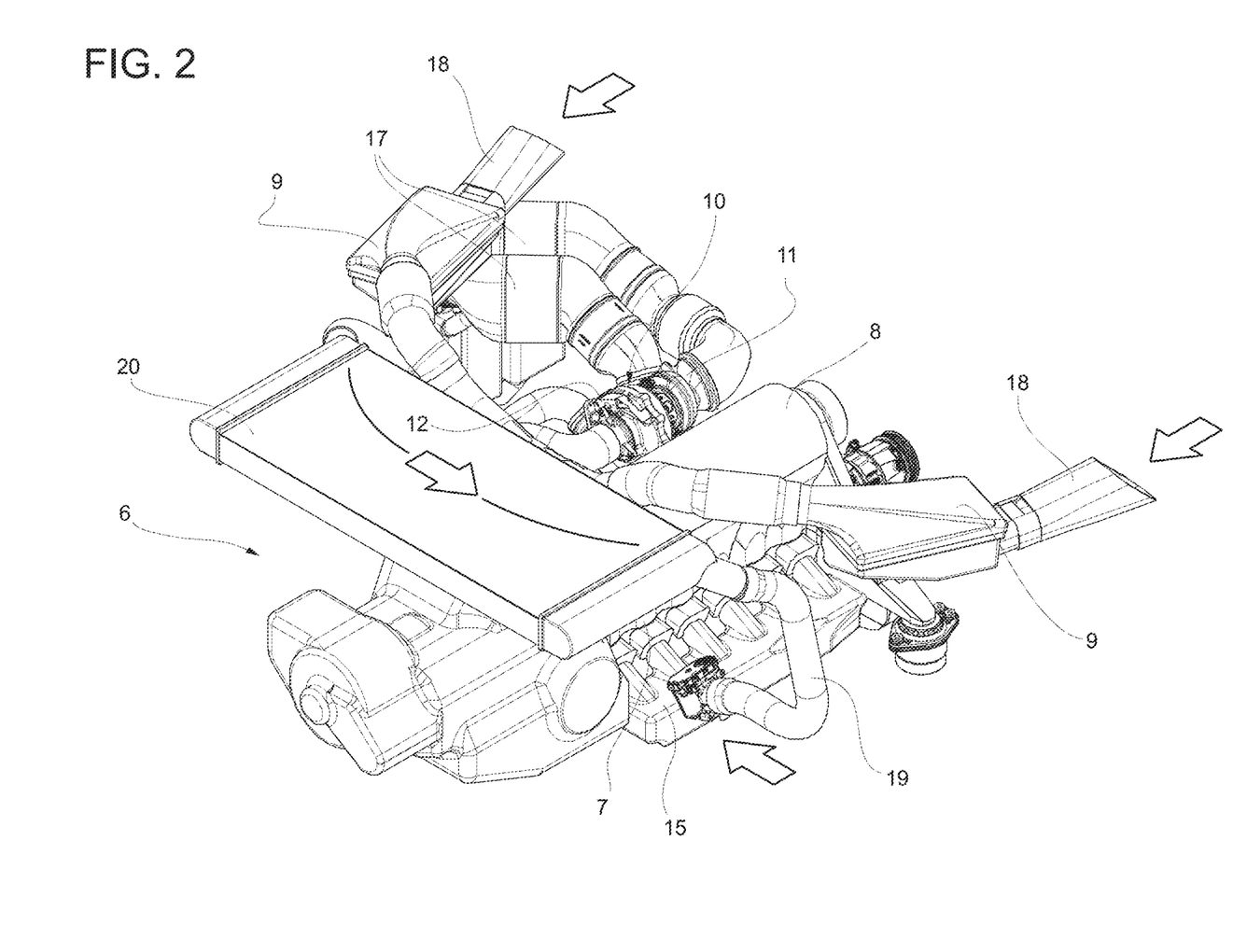
FIGS. 2, 3 are perspective views, on an enlarged scale, of the propulsion assembly according to different points of view.
Figure 3:
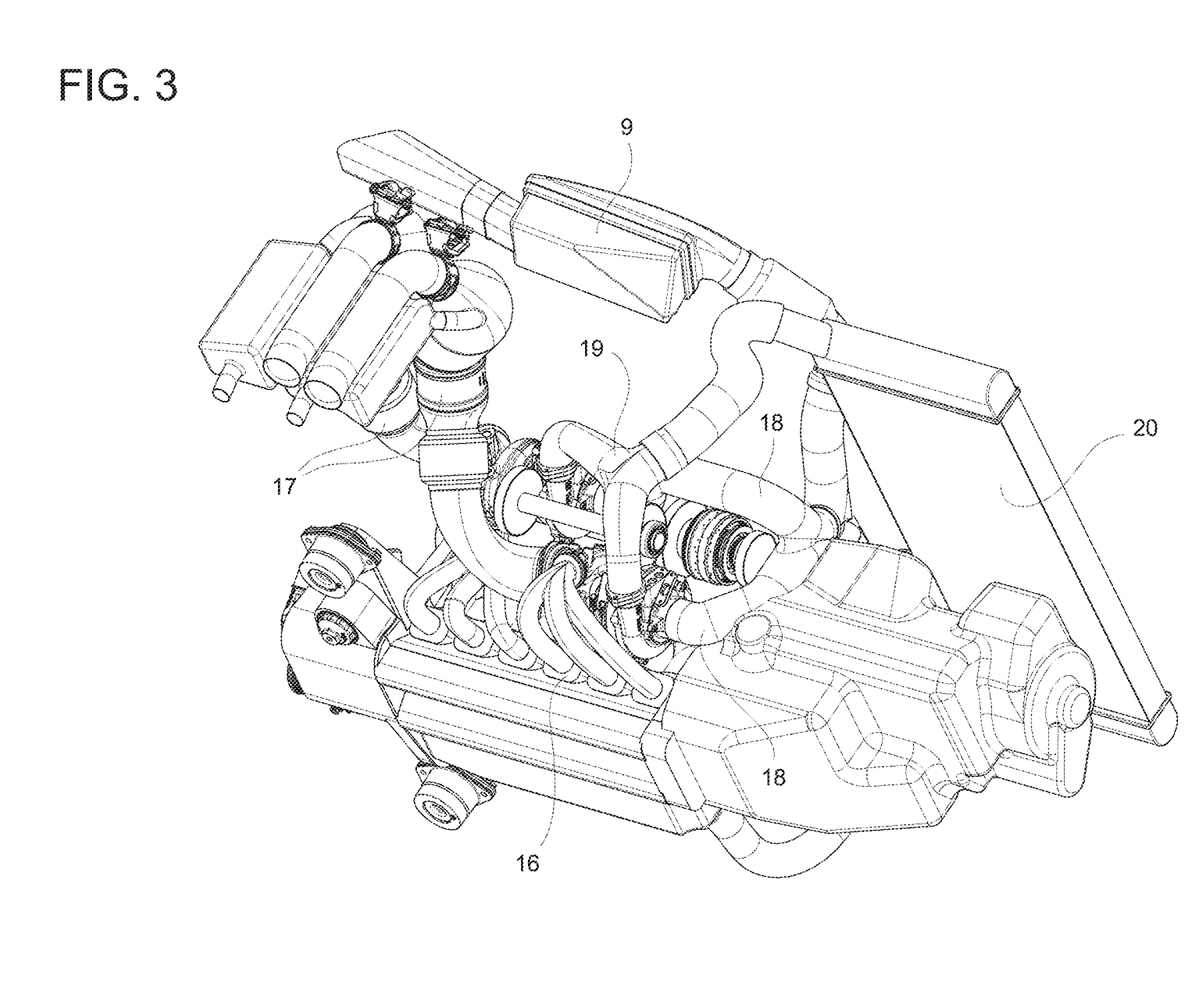
Figure 4:
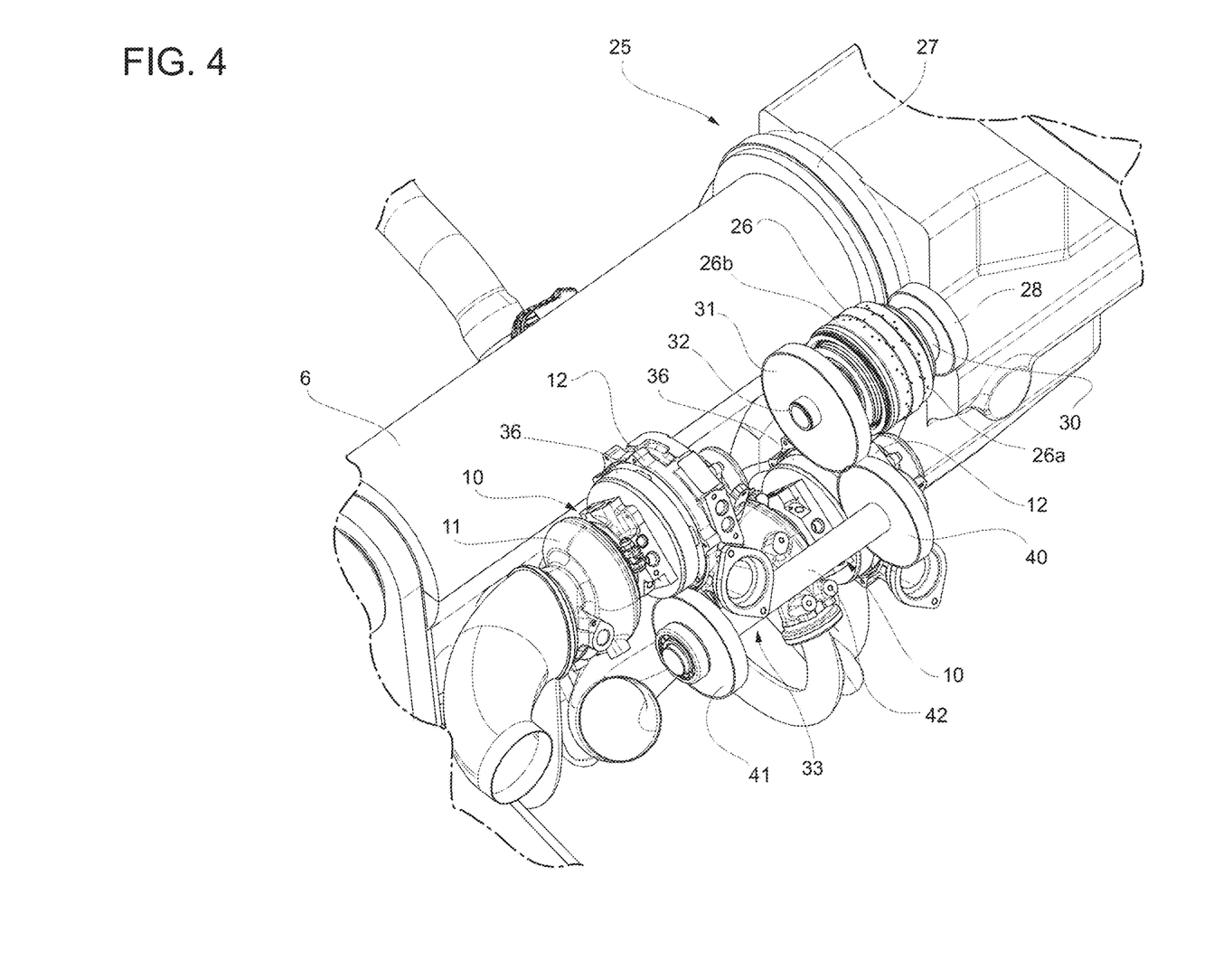
FIG. 4 is a perspective view, on an enlarged scale, of a detail of the propulsion assembly, the detail including a particular transmission for coupling components of the propulsion assembly.

In FIG. 1, reference numeral 1 is used to indicate, as a whole, a vehicle, specifically a motor vehicle, in particular of sports or racing type.

The motor vehicle 1 comprises a body 2, in turn including a chassis not illustrated and a bodywork 3, externally visible in FIG. 1.

The motor vehicle 1 has a forward movement direction, which allows conceptually dividing the body 2 into a front portion 4, in front of a passenger compartment of the motor vehicle 1, and into a rear portion 5 behind the passenger compartment.

The motor vehicle 1 further comprises an internal combustion engine 6, in turn comprising a cylinder head 7 and a crankcase 8.

In the illustrated non-limiting embodiment, the engine 6 is optionally arranged at the rear portion 5.

More specifically, the cylinder head 7 faces downward. Consequently, the crankcase 8 is arranged above the cylinder head 7.

In other words, the engine 6 has an upside-down configuration with respect to what usually occurs in the known motor vehicles.

This allows, for example, locating above the engine 6 a plurality of devices which are auxiliary for the operation of said engine 6.

The body 2 defines a compartment having, above the engine 6, an available volume greater than a volume of said compartment below the engine 6.

Therefore, the location of the auxiliary devices above the engine 6 or the cylinder head 7 constitutes an optimal use of the available volumes defined by the body 2.

The engine 6 is part of a propulsion assembly for the motor vehicle 1. The assembly can comprise, for example, the auxiliary devices and can clearly be part of the motor vehicle 1, although it could also be provided separately.

Besides the engine 6, the assembly further comprises one or more turbochargers 10. In the specific illustrated example, the assembly comprises two distinct turbochargers 10.

Preferably, one or both turbochargers 10 are arranged above or higher than the cylinder head 7 and/or the engine 6. The term above is to be understood as placed in a position having a greater height.

Each one of the turbochargers 10 comprises a turbine 11 adapted to expand exhaust gases of the engine 6, thereby generating work, and a compressor 12 adapted to compress air by work generated by the turbine 11.

More precisely, the compressor 12 comprises a shaft 13 (FIG. 5), which is rotatable about its own axis and coupled to the turbine 11.

The work of the turbine 11 drives into rotation the shaft 13. Correspondingly, the compressor 12 is configured to compress air via the rotation of the shaft 13.

In particular, the shaft 13 is also a shaft of the turbine 11, as it normally occurs in the known turbochargers, although this is not necessary.

The compressor 12 comprises at least one impeller not illustrated and keyed to the shaft 13. Similarly, the turbine 11 comprises a rotor not illustrated and keyed to the shaft 13.

Therefore, the expansion of the exhaust gases in the turbine 11 entails the rotation of the rotor of the turbine 11 and thus of the shaft 13, which in turn drives into rotation the impeller of the compressor 12, which is configured to compress the air entering the compressor 12.

More specifically, the engine 6 comprises an intake manifold 15, by means of which the engine 6 sucks air to be mixed with fuel, and an exhaust manifold 16, by means of which the engine 6 discharges the exhaust gases caused by the combustion.

Each turbine 11 has a corresponding inlet for the exhaust gases to be expanded communicating with the exhaust manifold 16 by means of an exhaust line or duct 17. Furthermore, the turbine 11 has an outlet for the expanded exhaust gases communicating with an exhaust of the motor vehicle 1 not illustrated.

The exhaust line 17 is part of the propulsion assembly.

Furthermore, each compressor 12 has a corresponding inlet for the air to be compressed communicating with the outside by means of a feed line or duct 18. The feed line 18 preferably comprises an air filter 9. Similarly, each compressor 12 has an outlet for the compressed air communicating with the intake manifold 15 by means of an intake line or duct 19. The intake line 19 preferably comprises an intercooler 20.

In order to deliver power or more simply for its operation, the engine 6 comprises a plurality of movable members, for example members belonging to the so-called distribution apparatus of the engine 6.

Figure 5:
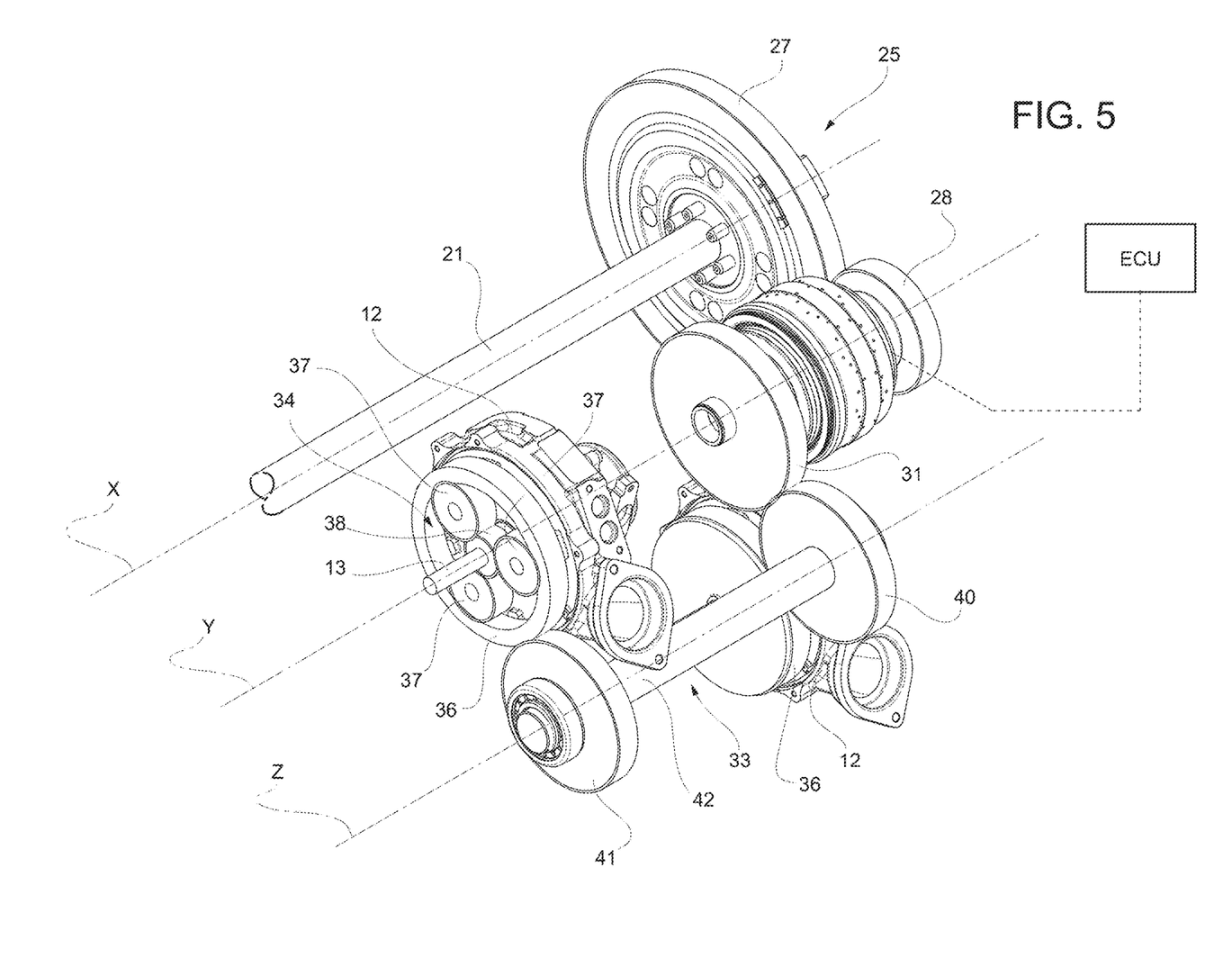
FIG. 5 is a perspective view of the transmission of FIG. 4, with parts removed for clarity.

An example of such movable members is the drive shaft 21, partially shown in FIG. 5.

The drive shaft 21 is an example of shaft of the engine 6 rotatably supported about a rotation axis of its own. The rotation axis of the drive shaft 21 is indicated in FIG. 5 by the symbol X.

Figure 6:
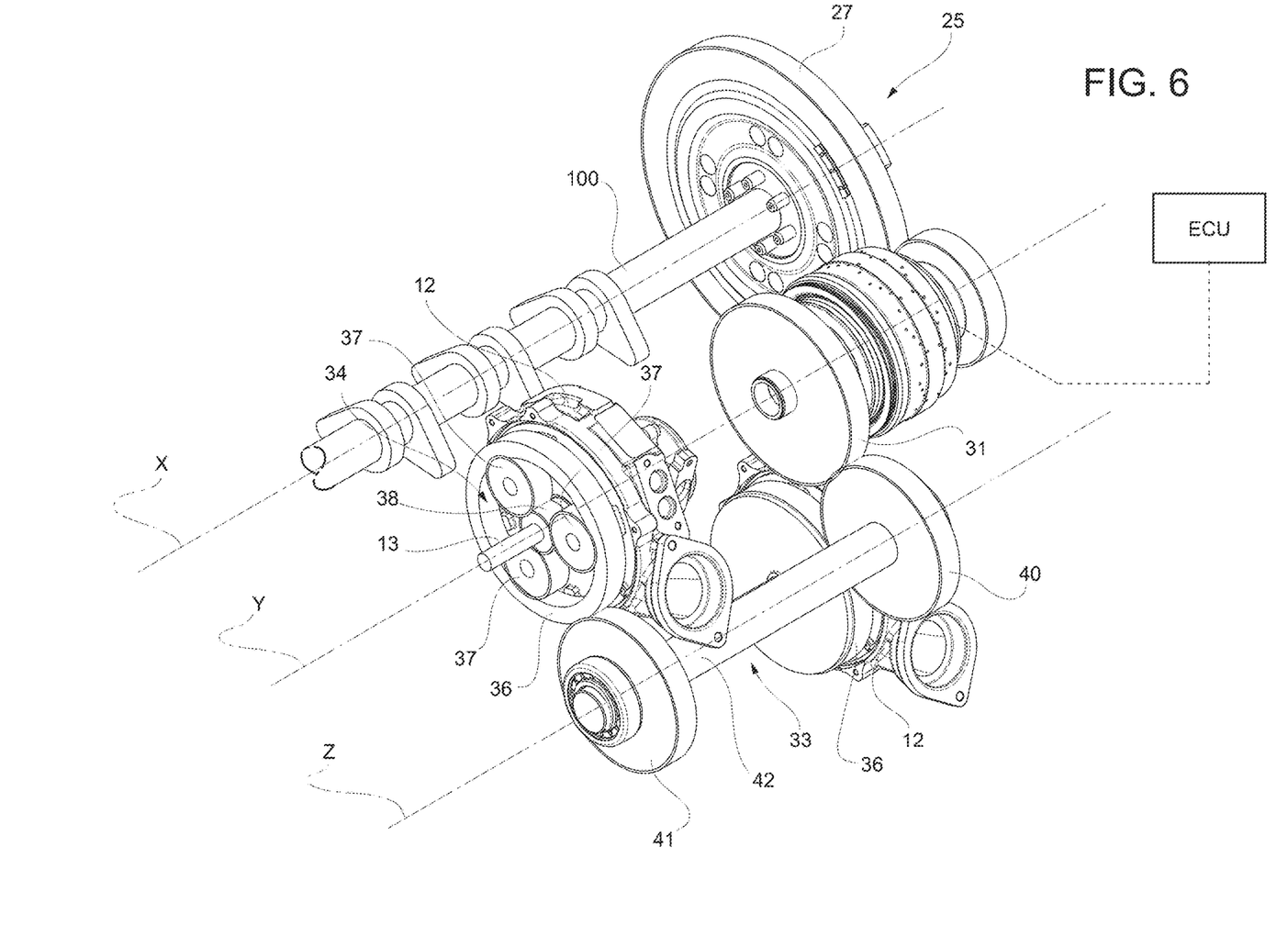
FIG. 6 is a perspective view of an alternative embodiment of the transmission, with parts removed for clarity.

Another example of shaft which can be part of movable members of the engine 6 is a camshaft 100 schematically illustrated in FIG. 6 instead of the drive shaft 21 along the axis X.

Like the drive shaft 21, since the camshaft 100 is another example of the above-mentioned movable members of the engine 6, the camshaft 100 belongs to the distribution apparatus of the engine 6.

The camshaft 100, namely its rotation, is configured to adjust the distribution timing of the engine 6, i.e. is configured to control the opening and the closing of the intake and exhaust valves of the engine 6.

In the following of the description, the drive shaft 21 will be considered a specific example of movable member of the engine 6, but such example can be replaced by any other known movable member of the engine 6, among which a generic shaft rotatable about its own axis or the camshaft 100, more specifically, as long as the movable member in question moves according to the power delivered by the engine 6.

In other words, the movable member moves in a manner corresponding to the power delivered by the engine 6 or alternatively to the manner of operating or to the operating regime of the engine 6.

Still alternatively, the movable member moves in a manner corresponding to the speed of the drive shaft 21, i.e. to the speed exiting the engine 6. In fact, it goes without saying that should the motion of the movable member depend on the power, said motion will inevitably also depend on the speed, because the power is a function of the speed and vice versa.

According to the invention, the propulsion assembly further comprises a transmission group 25 configured to couple the movable member, in the particular illustrated example comprising the drive shaft 21, to at least one shaft 13.

In this manner, the transmission group 25 determines a transmission of motion, specifically of rotary motion, between the drive shaft 21 or the movable member and the shaft 13.

In other words, the rotation of the movable member is transmitted via the transmission group 25 to the shaft 13 in the form of rotation of the shaft 13. Still in other words, the rotation of the movable member causes the rotation of the shaft 13 via the transmission group 25.

Here, more specifically, there is a plurality of compressors 12 and corresponding shafts 13, thus the transmission group 25 is configured to couple all the members 13 to the movable member.

In particular, the transmission group 25 is configured so that the speed transmission ratios between the shafts 13 and the movable member are all identical to one another.

Clearly, the speed transmission ratios between the shafts 13 and the movable member are the ratios between the rotation speeds of the shafts 13 and the rotation speed of the movable member.

Conveniently, the transmission group 25 comprises a clutch device or more simply a clutch 26 controllable to selectively couple and decouple the drive shaft 21 to/from the shafts 13.

The clutch 26 has at least two configurations, i.e. an engaged configuration, wherein the clutch 6 couples the drive shaft 21 to the shafts 13, and a disengaged configuration, wherein the drive shaft 21 is decoupled from the shafts 13.

The clutch 26 can be selectively controlled in its two positions.

The clutch 26 comprises at least two clutch elements 26a, 26b, which are respectively engaged and detached with respect to each other when the clutch 26 is in the engaged and disengaged position.

In this case, the clutch elements 26a, 26b are engaged with respect to each other in the engaged position by friction, although this is not strictly necessary. For example, the elements 26a, 26b could engage with respect to each other in a positive manner. For example, in the latter case, the clutch 26 could be a toothed clutch.

Still more specifically, the clutch elements 26a, 26b are pressed against each other in the engaged position, such that the engagement pressure between the clutch elements 26a, 26b determines a limit of torque transmittable via the clutch 26, beyond which the elements 26a, 26b slip with respect to each other causing a reduction in the transmitted torque and consequently in a torque transmission ratio through the clutch 26, i.e. more in general in a torque transmission ratio between the drive shaft 21 and the shafts 13.

The slipping of the clutch elements 26a, 26b, i.e. more in general the slipping of the clutch 26, is controllable. Therefore, the torque transmission ratio is controllable by means of the slipping or the clutch 26.

For clarity, the torque transmission ratio can be understood, for example, as a ratio between the torque on the element 26a and the torque on the element 26b. The torque transmission ratio is similar or has a correspondence with the speed transmission ratio, which can be understood, for example, as a ratio between the rotation speeds of the elements 26a, 26b. Therefore, the concept of torque transmission ratio could be replaced with the concept of speed transmission ratio.

Going into greater detail in the composition of the transmission group 25, the latter comprises a first gear comprising two gear wheels 27, 28 meshing with each other.

The wheel 27 is fixed with respect to the drive shaft 21. In particular, the engine 6 comprises a flywheel 29 keyed to the drive shaft 21; the flywheel 29 comprises, in turn, the wheel 27. Practically, in the particular illustrated example, the teeth of the wheel 27 define the external lateral surface of the flywheel 29.

The wheel 28 is rotationally fixed to the element 26a, in particular by means of a shaft 30, to which the wheel 28 is keyed and which carries the element 26a in a fixed manner in rotational terms.

The wheel 28 has a smaller diameter than that of the wheel 27. Therefore, the first gear multiplies the speed of the drive shaft 21 towards the element 26a and reduces the speed of the element 26a towards the drive shaft 21.

Furthermore, the transmission group 25 comprises a gear wheel 31 fixed in a rotational manner to the element 26b, in particular by means of a shaft 32, to which the wheel 31 is keyed and which carries the element 26b in a fixed manner in rotational terms.

The shafts 30, 32 are part of the transmission group 25.

The wheel 31 is coupled to the shafts 13, in particular by means of a transmission 33. This is due to the fact that here there are more shafts 13, but it would be the same also with one single shaft 13; in fact, the wheel 31 would be in such case coupled to the single shaft 13.

Specifically, the coupling with the shaft 13 takes place by means of a planetary gear train 34 of the transmission 33. More specifically, each shaft 13 is coupled to the wheel 31 by means of the corresponding planetary gear train 34, thus the transmission 33 comprises two planetary gear trains 34 in the illustrated example.

The planetary gear train 34 comprises a ring gear 36, planet gears 37, and a sun gear 38. Furthermore, the planetary gear train 34 comprises a planet carrier not illustrated which fixes the axes of the planet gears 37 with respect to one another.

The sun gear 38 is fixed with respect to the shaft 13 and is more in particular keyed to it. The planet gears 37 mesh both with the sun gear 38 and with the ring gear 36 so as to be able to have a revolution motion about the sun gear 38 by means of the planet carrier. Each ring gear 36 is coupled to the wheel 31, thus there is a transmission of motion between the wheel 31 and the ring gear 36.

More in particular, the transmission 33 comprises a second gear comprising a gear wheel 40, the gear wheel 31, and one of the ring gears 36. The gear wheel 40 externally meshes both with the wheel 31 and with the ring gear 36; the latter then internally meshes with the planet gears 37.

Furthermore, the transmission 33 comprises a third gear comprising a gear wheel 41 and the other one of the ring gears 36 meshing with each other.

The wheels 40, 41 are fixed with respect to each other, in particular because they are both keyed to a shaft 42 of the transmission 33.

Specifically, the speed transmission ratios between the ring gears 36 and the respective wheels 40, 41 are identical. In this manner, the shafts 13 all rotate with the same rotation speed.

In the illustrated embodiment, one of the shafts 13 has an axis Y, which is also the axis of the wheels 28, 31. The shaft 42 has an axis Z, which is also the axis of the wheels 40, 41. The axes X, Y, Z are all parallel with respect to one another.

As already mentioned in the foregoing, the transmission group 35 comprises at least one transmission device controllable for adjusting the torque transmission ratio between the drive shaft 21 and the shafts 13.

In this case, the transmission device comprises the clutch 26, the slipping of which is controllable for adjusting the torque transmission ratio, as explained above.

Alternatively or additionally, the transmission device could comprise a gearbox, for example, with the consequent possibility of selecting among a plurality of available torque transmission ratios. In fact, the gearbox is here understood as a device which allows a plurality of gear shifting operations and thus a selection of the torque transmission ratio.

Furthermore, the propulsion assembly preferably comprises a control unit ECU configured to control the transmission device, i.e. specifically the clutch 26.

More specifically, the control unit ECU controls the transmission device by controlling the torque transmission ratio as a function of one or more control quantities of the engine 6.

For example, the control quantities of the engine 6 can include the torque currently exiting the engine 6 and a target torque for the torque exiting the engine 6.

According to an example, the control unit ECU is configured to control the transmission device, i.e. specifically the clutch 26, more specifically an arrangement thereof in the engaged position or in the disengaged position, namely a slipping thereof in the engaged position, according to a control law adapted for minimizing a difference between the target torque and the currently exiting torque. In particular, the control law can be any closed-loop control law, for example a proportional, proportional-integral, proportional-integral-derivative (PID) control law, namely a modern control law in the state space. Alternatively, the control law could even be an open-loop control law, without any loss of generality.

According to another example, the control unit ECU is configured to control the torque transmission ratio as solution of an optimal control problem.

The solution of the optimal control problem is defined in particular by maximization or minimization of an objective function, which more in particular includes the control quantities of the engine 6.

For example, the objective function can correspond to the consumptions of the motor vehicle 1, so that the solution of the problem is the minimization of the objective function.

Alternatively, the objective function can generically correspond to a performance index of the motor vehicle 1, so that the solution of the problem is the maximization of the objective function.

Actually, the slipping of the clutch 26 or the shifting of the clutch 26 between the engaged position and the disengaged position (possibly, the engaged position and the disengaged position can be equivalently considered as a position with slipping comprised between null and total and a position with total slipping, respectively) clearly affects the operation of the engine 6 and of the motor vehicle 1.

In fact, depending on the revolutions of the engine 6 and of the resistance that the motor vehicle 1 meets during its operation, the slipping of the clutch 26 determines the torque on the drive shaft 21 and on the shafts 13, as well as more in general the entire dynamic of the propulsion assembly.

For example, assuming a null slipping, when the engine 6 operates at minimum regime, the exhaust gases have a relatively low enthalpy, thus the torques exerted by the turbines 11 on the shafts 13 are relatively low. However, the torques resulting on the shafts 13 are increased thanks to the contribution of the torque exiting the engine 6. In other words, the engine 6 contributes to drive the compressors 12 together with the turbines 11. In this manner, the pressure of the air sucked by the engine 6 is greater than a case with non-null slipping, which modifies the combustion conditions in the engine 6 and consequently the torque balance on the drive shaft 21.

Similarly, assuming a null slipping, when the engine 6 operates at maximum regime, the exhaust gases have a relatively high enthalpy, thus the torque exerted by the turbines 11 on the shafts 13 would be relatively high. However, the torques associated with the work generated by the turbines 11 are divided between the shafts 13 and the drive shaft 21. In other words, the turbines 11 contribute to drive the motor vehicle 1 or the drive shaft 21 together with the engine 6. In this manner, the pressure of the air sucked by the engine 6 is smaller than a case with non-null slipping, which modifies the combustion conditions in the engine 6 and consequently the torque balance on the drive shaft 21.

Based on the foregoing, the advantages of the motor vehicle 1 and of the procedure according to the invention are evident.

In particular, when the revolutions of the engine 6 are low, the efficiency of the supercharging remains high because the engine 6 drives the compressors 12 making up for the relatively low work of the turbines 11.

On the other hand, when the revolutions of engine 6 are high, the high work produced by the turbines 11 does not entail overpressures in the intake manifold 15, but rather is even exploited for driving the motor vehicle 1.

Thanks to the latter aspect, the propulsion assembly may not include the wastegate valve. In fact, in the specific illustrated example, the propulsion assembly is devoid of any wastegate valve, i.e. any valve which allows the exhaust gases to bypass the turbines 11.

Positively, the exhaust line 17 is configured to convey the entire flow of the exhaust gases through the turbines 11 or through the turbochargers 10.

Finally, it is clear that modifications and variations can be made to the supercharging device according to the invention which anyway do not depart from the scope of protection defined by the claims.

In particular, each one of the devices schematically shown in the figures is independent of the other details and is specifically designed to solve specific technical problems in isolation with respect to the other details.

The invention claimed is:

1. A propulsion assembly for a motor vehicle, the propulsion assembly comprising
    an internal combustion engine comprising at least one movable member according to an operating regime of said engine, and
    two turbochargers comprising respective turbines adapted to expand exhaust gases of said engine by generating work and respective compressors respectively adapted to compress air by work generated by the relative turbines to supercharge said engine,
    the compressors comprising respective compressor shafts respectively coupled to the turbines in such a manner as to be driven into a rotation by the work generated by the turbines and being configured to compress air via the rotation of the compressor shafts,
    the propulsion assembly further comprising mechanical transmission means configured to couple the movable member to both the compressor shafts, thereby establishing a transmission of motion between the movable member and the compressor shafts, wherein respective speed transmission ratios between the compressor shafts and the movable member are identical to one another.

2. The propulsion assembly according to claim 1, wherein the movable member comprises a shaft rotatably supported about its own axis.

3. The propulsion assembly according to claim 2, wherein the shaft comprises a drive shaft.

4. The propulsion assembly according to claim 2, wherein the shaft comprises a camshaft.

5. A motor vehicle comprising the propulsion assembly according to claim 1, wherein said engine has a cylinder head facing downward and a crankcase arranged above the cylinder head.

6. The motor vehicle according to claim 5, wherein the turbocharger is arranged higher than the cylinder head.

7. The propulsion assembly according to claim 1, wherein the speed transmission ratios are controlled as a solution of an optimal control problem, the solution being defined by minimization of an objective function including a current output torque of the engine.

8. A propulsion assembly for a motor vehicle, the propulsion assembly comprising:
    an internal combustion engine comprising at least one movable member according to an operating regime of said engine, and
    a turbocharger comprising a turbine adapted to expand exhaust gases of said engine by generating work and a compressor adapted to compress air by work generated by the turbine to supercharge said engine,
    the turbocharger comprising a turbocharger shaft coupled to the turbine in such a manner as to be driven into a rotation by the work generated by the turbine and further coupled to the compressor to drive the compressor via the work generated by the turbine to compress air,
    characterized by further comprising mechanical transmission means configured to couple the movable member to the turbocharger shaft, thereby establishing a transmission of motion between the movable member and the turbocharger shaft,
    the mechanical transmission means comprising a transmission device controllable to adjust a torque transmission ratio between the movable member and the turbocharger shaft,
    further comprising a control unit configured to control the transmission device by controlling the torque transmission ratio as a function of one or more control quantities of said engine,
    wherein the control unit is configured to control the torque transmitted to the turbocharger shaft by adjusting the torque transmission ratio as minimizer or maximizer of an objective function including a current output torque of the engine, wherein the mechanical transmission means comprises two turbocharger shafts, the mechanical transmission means configured to couple the movable member to both the compressor shafts, thereby establishing a transmission of motion between the movable member and the turbocharger shafts, wherein respective speed transmission ratios between the turbocharger shafts and the movable member are identical to one another.

9. A propulsion assembly for a motor vehicle, the propulsion assembly comprising:
    an internal combustion engine comprising at least one movable member according to an operating regime of said engine, and a turbocharger comprising a turbine adapted to expand exhaust gases of said engine by generating work and a compressor adapted to compress air by work generated by the turbine to supercharge said engine, the turbocharger comprising a turbocharger shaft coupled to the turbine in such a manner as to be driven into a rotation by the work generated by the turbine and further coupled to the compressor to drive the compressor via the work generated by the turbine to compress air, characterized by further comprising mechanical transmission means configured to couple the movable member to the turbocharger shaft, thereby establishing a transmission of motion between the movable member and the turbocharger shaft, the mechanical transmission means comprising a transmission device controllable to adjust a torque transmission ratio between the movable member and the turbocharger shaft, further comprising a control unit configured to control the transmission device by controlling the torque transmission ratio, wherein the control unit is configured to control the torque transmitted to the turbocharger shaft by adjusting the torque transmission ratio to minimize a difference between a target torque and a current output torque of the engine, wherein the mechanical transmission means comprises two turbocharger shafts, the mechanical transmission means configured to couple the movable member to both the turbocharger shafts, thereby establishing a transmission of motion between the movable member and the turbocharger shafts, wherein respective speed transmission ratios between the turbocharger shafts and the movable member are identical to one another.

\* \* \* \* \*